US007015897B2

(12) United States Patent
Tsao

(10) Patent No.: US 7,015,897 B2
(45) Date of Patent: Mar. 21, 2006

(54) PUSHBUTTON OF TOUCH PAD OF ELECTRONIC DEVICE

(75) Inventor: Shen-Chang Tsao, Taoyuan (TW)

(73) Assignee: Taiwan Tri Gem Information Co., Ltd., Taipei (TW)

( * ) Notice: Subject to any disclaimer, the term of this patent is extended or adjusted under 35 U.S.C. 154(b) by 510 days.

(21) Appl. No.: 10/245,979

(22) Filed: Sep. 17, 2002

(65) Prior Publication Data

US 2004/0061686 A1 Apr. 1, 2004

(51) Int. Cl.
*G09G 5/00* (2006.01)

(52) U.S. Cl. .................... 345/168; 341/22; 200/345
(58) Field of Classification Search ................ 345/173, 345/168; 341/22, 34; 200/511, 512, 513, 200/515, 341, 344, 345; 400/490, 491, 495
See application file for complete search history.

(56) References Cited

U.S. PATENT DOCUMENTS

| 5,339,213 | A |   | 8/1994 | O'Callaghan ............... 361/683 |
| 5,717,429 | A | * | 2/1998 | Coulon et al. ............... 345/168 |
| 5,729,221 | A | * | 3/1998 | Krolopp et al. ............... 341/22 |
| 5,856,822 | A |   | 1/1999 | Du et al. ..................... 345/145 |
| 5,909,211 | A |   | 6/1999 | Combs et al. ............... 345/172 |
| 6,023,033 | A | * | 2/2000 | Yagi et al. .................. 200/512 |
| 6,388,660 | B1 |  | 5/2002 | Manser et al. .............. 345/173 |
| 6,429,846 | B1 | * | 8/2002 | Rosenberg et al. ......... 345/156 |

* cited by examiner

Primary Examiner—Kent Chang

(57) ABSTRACT

A touch pad pushbutton structure includes two pushbuttons mounted to a casing of an electronic device, such as a notebook computer. Each pushbutton has a circumferential flange. Two deflectable U-shaped ribs integrally extend from the flanges of the pushbuttons and connect between the pushbuttons at opposite ends of the pushbuttons. The ribs are fixed to the casing for movably supporting the pushbutton on the casing whereby each pushbutton is allowed to move from a released position where the flange of the pushbutton engages the casing to an actuated position where the pushbutton is depressed and the flange thereof separated from the casing for activating a circuit to generate a signal indicating the depression of the pushbutton.

11 Claims, 4 Drawing Sheets

PUSHBUTTON OF TOUCH PAD OF ELECTRONIC DEVICE

FIELD OF THE INVENTION

The present invention relates generally to an electronic device having a touch pad, and in particular to a pushbutton structure of the touch pad.

BACKGROUND OF THE INVENTION

Electronic devices, such as portable computers, are equipped with a tracking device or a cursor-controlling device for user input of instructions and data. A variety of tracking devices are known, such as a computer mouse that is connected to a computer by a mouse cable, a tracking ball that is mounted in the casing of a portable computer, a digitizer that is connected to a computer by a cable and requires a stylus for input of data and instruction and a touch pad that is usually mounted on the casing of a computer and allows a user finger to touch and move thereon for controlling the cursor on a computer display. Often, a couple of pushbuttons are mounted next to the touch pad to help the operation thereof.

Conventionally, the touch pad pushbuttons are separate parts of the computer casing and are movably supported by biasing elements, such as springs, above a circuit of the touch pad whereby striking a pushbutton causes a physical engagement of the pushbutton with the circuit thereby initiating generation of a signal through the circuit for indication of the striking of the pushbutton. Such pushbuttons may accidentally get out of position during the operation thereof. In addition, the conventional pushbuttons require a sophisticated assembly process, which adds to the overall manufacturing cost of the electronic devices.

Thus, it is desired to have a touch pad pushbutton structure that overcomes or at least alleviates the problems discussed above.

SUMMARY OF THE INVENTION

An object of the present invention is to provide a touch pad pushbutton structure for an electronic device, which is securely attached to a casing of the electronic device so as to eliminate undesired separation from the electronic device.

Another object of the present invention is to provide a touch pad pushbutton structure requiring a simple assembly process with reduced manufacturing costs.

To achieve the above objects, in accordance with the present invention, there is provided a touch pad pushbutton structure comprising a plurality of pushbuttons mounted to a casing of an electronic device, such as a notebook computer. Each pushbutton has a circumferential flange. Two deflectable U-shaped ribs integrally extend from the flanges of the pushbuttons and connect among the pushbuttons at opposite ends of the pushbuttons. The ribs are fixed by fasteners to the casing for movably supporting the pushbutton on the casing whereby each pushbutton is allowed to move from a released position where the flange of the pushbutton engages the casing to an actuated position where the pushbutton is depressed and the flange thereof separated from the casing for activating a circuit to generate a signal indicating the depression of the pushbutton.

BRIEF DESCRIPTION OF THE DRAWINGS

The present invention will be apparent to those skilled in the art by reading the following description of a preferred embodiment thereof, with reference to the attached drawings, in which.

DETAILED DESCRIPTION OF THE INVENTION

Figure 2:
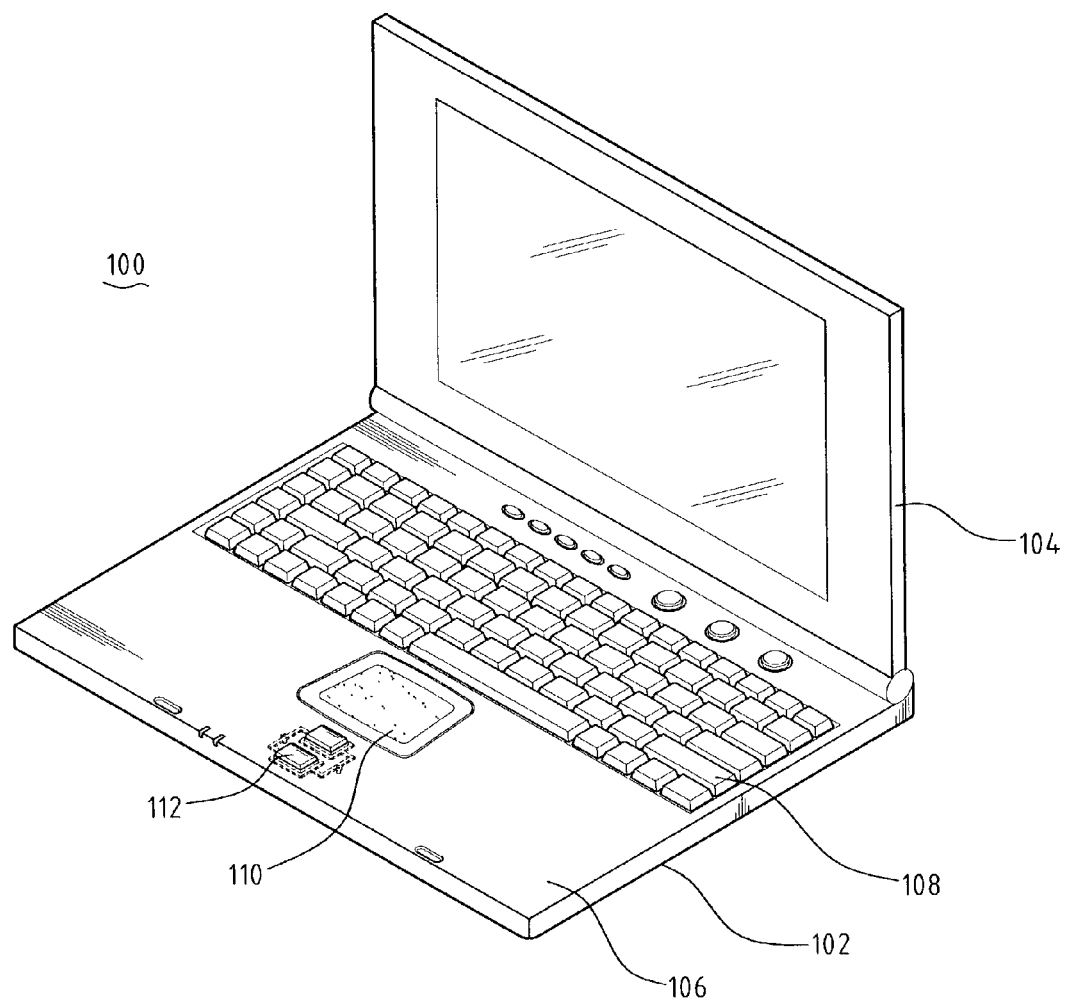
FIG. 2 is a perspective view of a notebook computer to which the touch pad pushbutton structure of the present invention is mounted.

With reference to the drawings and in particular to FIG. 2, an electronic device, such as a notebook computer as shown, generally designated with reference numeral 100, comprises a casing 102 and a display 104 pivotally connected to the casing 102. The casing 102 has a top wall 106 on which a keyboard set 108 and a touch pad assembly 110 are mounted. The touch pad assembly 110 comprises a number of pushbuttons 112. Although it is shown in the drawings that the number of the touch pad pushbuttons 112 is two, it is apparent to those having ordinary skills to increase or decrease the number of the pushbuttons 112 if necessary.

Figure 1:
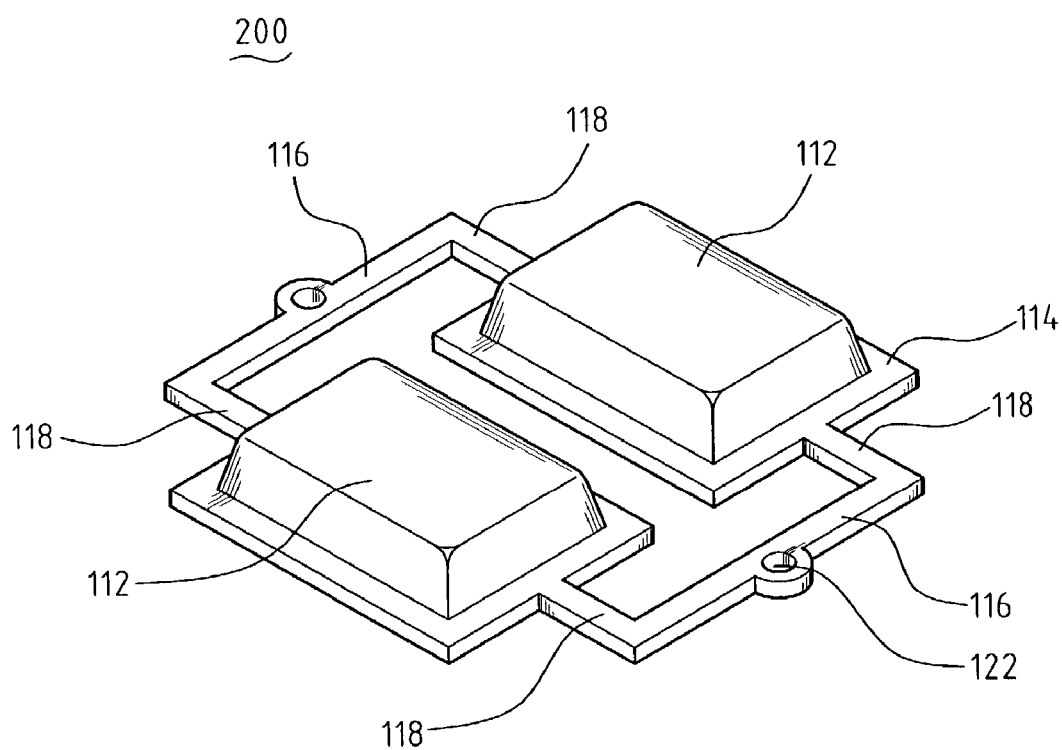
FIG. 1 is a perspective view of a touch pad pushbutton structure constructed in accordance with the present invention.

Also referring to FIG. 1, the pushbuttons 112 are formed as a unitary member, which will be referred to as pushbutton structure and designated with reference numeral 200. The pushbutton structure 200 comprises two pushbuttons 112 preferably made by molding techniques. The pushbuttons 112 are arranged in a side-by-side manner and spaced from each other by a predetermined distance. Each of the pushbuttons 112 has a circumferential flange 114. Two connection ribs 116 connect between the pushbuttons 112 at opposite ends of the pushbuttons 112. The connection ribs 116 are made in the form of a U-shape, having two end sections 118 respectively and integrally formed with the flanges 114 of the pushbuttons 112. Thus, the pushbuttons 112 are connected together by the connection ribs 116 as a unitary member. Preferably, the pushbutton structure 200, which comprises the pushbuttons 112 and the connection ribs 116, is made by molding techniques. As can be seen from FIG. 1, the bottom circumferential flanges of the pushbuttons are surrounded by open spaces and have no support other than the ribs extended from the pushbuttons. Therefore, the pushbuttons can be reliably and easily depressed and released.

Figure 3:
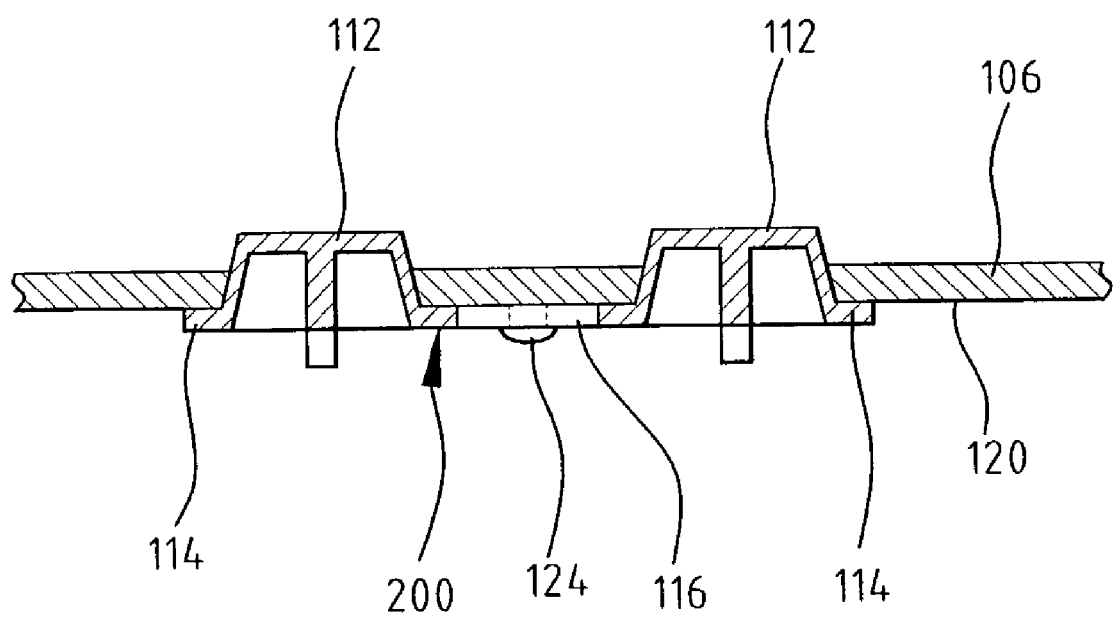
FIG. 3 is a cross-sectional view of a portion of the notebook computer and the pushbutton structure in a released condition.
Figure 4:
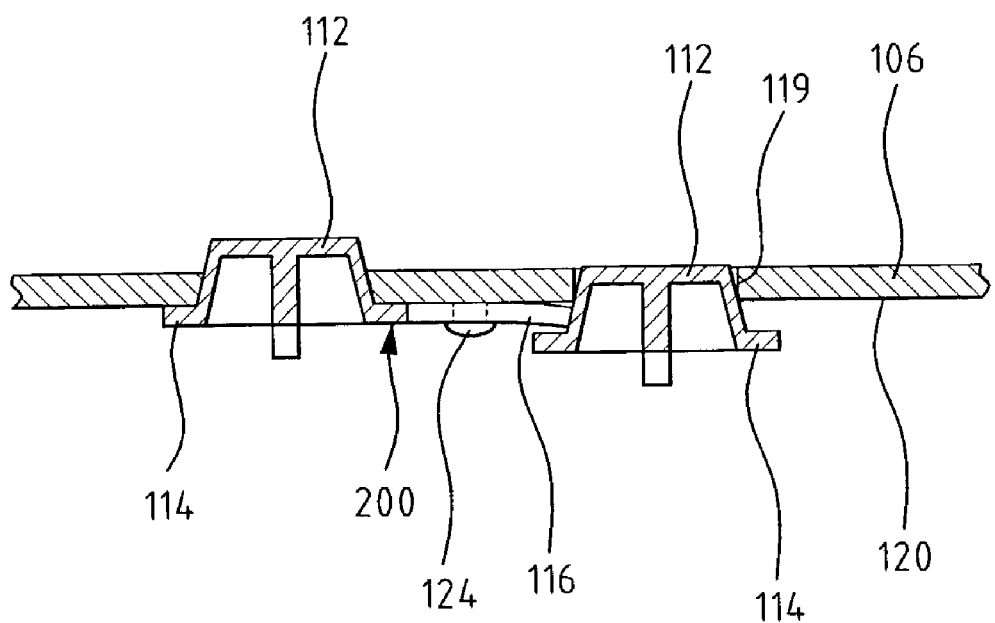
FIG. 4 is a cross-sectional view similar to FIG. 3 but showing the pushbutton structure in a depressed condition.

Also referring to FIGS. 3 and 4, the top wall 106 of the casing 102 of the notebook computer 100 defines two openings 119 (see FIG. 4) adjacent to the touch pad 110 for movably and respectively accommodating the pushbuttons 112 of the pushbutton structure 200 therein with the flanges 114 of the pushbuttons 112 abutting against an underside 120 of the wall 106. The connection ribs 116 of the pushbutton structure 200 are attached to the underside 120 of the wall 106 by any known means. For example and for illustration only, each connection rib 116 defines a through hole 122 for receiving a fastener 124, such as a bolt and a rivet, that mounts the connection rib 116 to the wall 106 thereby securing the pushbutton structure 200 to the casing 102. If desired, the fastener 124 can be a molded rivet integrally formed with the casing 102.

The connection ribs 116 are made of a resilient material or are shaped and dimensioned to be deflectable subject to an external force, such as a depression force imposed on the pushbuttons 112. Thus, the pushbuttons 112 are allowed to move from a released condition as shown in FIG. 3 where the flanges 114 of the pushbuttons 112 abut against the underside 120 of the wall 106 toward a depressed condition as shown in FIG. 4 where a depressing or striking force is applied to one of the pushbuttons 112 and deflects the connection ribs 116 to move the pushbutton 112 away from the underside 120 of the wall 106.

The movement of the pushbutton 112 allows for activation of a circuit associated with the pushbutton structure 200 to generate a signal representing the depression of the pushbutton 112. Since the circuit is known, no further discussion is needed herein.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. A touch pad pushbutton structure adapted to be mounted to a casing of an electronic device, the pushbutton structure comprising:
   at least one pushbutton adapted to be movably accommodated in an opening defined in a wall of the casing; and
   a deflectable rib extending from the pushbutton and attached to an underside of the wall for movably supporting the pushbutton;
   wherein the pushbutton has bottom flanges surrounded by open space and connected only to the deflectable rib.

2. The touch pad pushbutton structure as claimed in claim 1, wherein the touch pad pushbutton structure comprises two pushbuttons connected to each other by two ribs extending therebetween at opposite ends of the pushbuttons, the ribs being deflectable and attached to the underside of the wall for movably supporting the pushbuttons.

3. The touch pad pushbutton structure as claimed in claim 2, wherein the pushbuttons have flanges, the ribs extending from the flanges.

4. The touch pad pushbutton structure as claimed in claim 3, wherein the flanges and the ribs are integrally formed with the pushbuttons.

5. The touch pad pushbutton structure as claimed in claim 1, wherein the pushbutton comprises a flange engageable with the underside of the wall to define a released position of the pushbutton, the pushbutton being movable from the released position to an actuated position where the flange is separated from the wall.

6. The touch pad pushbutton structure as claimed in claim 1, wherein the touch pad pushbutton structure comprises two pushbuttons arrange in a side by side manner and spaced from each other, each pushbutton having a circumferential flange, two U-shaped ribs connecting between the pushbuttons at apposite ends of the pushbuttons, each rib comprising end sections respectively connected to the flanges of the pushbuttons, the ribs being attached to the underside of the wall for movably supporting the pushbuttons.

7. The touch pad pushbutton structure as claimed in claim 6, wherein each rib defines a through hole for receiving a fastener that attaches the touch pad pushbutton structure to the wall of the casing.

8. The touch pad pushbutton structure as claimed in claim 7, wherein the fastener comprises a bolt.

9. The touch pad pushbutton structure as claimed in claim 7, wherein the fastener comprises a rivet.

10. The touch pad pushbutton structure as claimed in claim 9, wherein the rivet is molded with the casing of the electronic device.

11. The touch pad pushbutton structure as claimed in claim 1, wherein the electronic device comprises a notebook computer.

* * * * *